United States Patent [19]

Evans

[11] Patent Number: 5,098,485

[45] Date of Patent: Mar. 24, 1992

[54] METHOD OF MAKING ELECTRICALLY INSULATING METALLIC OXIDES ELECTRICALLY CONDUCTIVE

[75] Inventor: David A. Evans, Seekonk, Mass.

[73] Assignee: Evans Findings Company, East Providence, R.I.

[21] Appl. No.: 584,618

[22] Filed: Sep. 19, 1990

[51] Int. Cl.⁵ ............................................ C23C 22/05
[52] U.S. Cl. .................................. 148/272; 148/245; 148/269; 148/276; 148/279; 148/281; 427/99; 427/419.1; 427/419.7
[58] Field of Search ............... 148/241, 243, 245, 284, 148/272, 285, 276, 286, 279, 287, 281, 245, 269; 427/99, 419.1, 419.7; 204/23, 35.1

[56] References Cited

U.S. PATENT DOCUMENTS

| | | |
|---|---|---|
| 270,004 | 1/1883 | Bower . |
| 661,650 | 1/1900 | Thurston . |
| 3,113,376 | 7/1958 | Pflumm et al. ............... 29/471.1 |
| 3,140,172 | 7/1964 | Coad ............................... 75/122 |
| 3,516,150 | 6/1970 | Leech ............................. 29/570 |
| 3,825,802 | 7/1974 | Kumagai et al. ............. 317/230 |
| 4,009,007 | 2/1977 | Fry ................................ 29/182.5 |
| 4,093,453 | 6/1978 | Makino et al. ................. 75/129 |
| 4,154,609 | 5/1979 | Hahn .............................. 75/252 |
| 4,178,193 | 12/1979 | Kanter ............................ 148/6 |
| 4,512,805 | 4/1985 | Albrecht et al. ................ 75/244 |
| 4,523,255 | 6/1985 | Rogers ........................... 361/433 |
| 4,544,403 | 10/1985 | Schiele et al. ............... 75/0.5 AB |
| 4,548,672 | 10/1985 | Albrecht et al. ............. 156/646 |
| 4,569,693 | 2/1986 | Albrecht et al. ............... 75/252 |
| 4,582,530 | 4/1986 | Heinrich et al. ............ 75/0.5 AB |
| 4,645,533 | 2/1987 | Izumi ........................... 75/0.5 AB |
| 4,780,797 | 10/1988 | Libby ........................... 361/433 |
| 4,942,500 | 7/1990 | Libby et al. .................. 361/516 |

Primary Examiner—Jay H. Woo
Assistant Examiner—Jeremiah F. Durkin, II
Attorney, Agent, or Firm—Leydig, Voit & Mayer

[57] ABSTRACT

A method of making an electrical contact to a metal on which an electrically insulating native oxide is formed includes applying atoms or ions to the native oxide, heating the metal and oxide to a temperature and for a time effective to make the oxide, where the atoms and/or ions have been applied, electrically conducting and in electrical communication with the metal. The invention may be employed to establish electrical contacts with native oxides on aluminum, molybdenum, niobium, tantalum, titanium, tungsten, and zirconium. The atoms and ions include aluminum, antimony, arsenic, boron, gallium, indium, phosphorus, and silicon. An aqueous solution of boric acid and trisodium phosphate may be applied to establish electrically conductive regions in an oxide on niobium, tantalum, titanium, and stainless steel after heat treatment. Brushing with palladium wires mechanically applies palladium atoms to tantalum oxide to establish electrical contact to the tantalum after heat treatment. The invention is useful in forming containers for electrolytic tantalum capacitors and making direct metal-to-metal electrical connections for capacitors and contacts for switches and relays.

26 Claims, No Drawings

METHOD OF MAKING ELECTRICALLY INSULATING METALLIC OXIDES ELECTRICALLY CONDUCTIVE

FIELD OF THE INVENTION

The present invention concerns a method of naturally form on metals electrically conductive for establishing stable electrical contacts to the metals underlying the oxides.

BACKGROUND OF THE INVENTION

A number of metallic elements and some metallic alloys are well known to form tough metallic oxide liquids including water. These oxide coatings are highly stable and provide the metals and alloys with very high corrosion resistance. Examples of elemental metals on which native oxides are formed by exposure to air include aluminum, molybdenum, niobium, tantalum, titanium, tungsten, and zirconium. Tough oxide coatings are also formed on some stainless steel alloys, such as 316 stainless steel.

Although corrosion resistance is usually a highly desirable characteristic, the native oxides are usually electrically insulating. When the metals and alloys are used in electronic applications requiring the formation of an electrical contact to them, the oxides interfere with the formation of the contacts. If the oxides are removed by chemical treatment, such as etching with an acid or electrolytic etching, to expose the underlying metal, special steps must be taken in order to complete the electrical contacts before the native oxide can be regenerated and interfere with the electrical contacts. These measures require special apparatus and extremely careful handling of the materials. Therefore, they add to the cost of fabricating electronic components incorporating these corrosion resistant materials to which electrical contacts must be made.

It is, therefore, desirable to provide a process for making electrical contacts to metals and metal alloys on which a native oxide forms upon exposure of the metal or alloy to air and/or water.

SUMMARY OF THE INVENTION

In the invention, stable electrical contacts are made to a metal or metal alloy, such as aluminum, molybdenum, niobium, tantalum, titanium, tungsten, and zirconium, on which a native oxide is present by altering the native oxide from an electrically insulating to an electrically conducting condition, i.e., without removal of the native oxide layer to expose the underlying metal or alloy.

According to the invention, selected foreign atoms and/or ions are applied to a portion of the native oxide on a metal or metal alloy where an electrical contact is to be formed. The selected foreign atoms and/or ions may be applied in a solution, from a vapor phase, or mechanically to the native oxide. Examples of the atoms and/or ions are aluminum, antimony, arsenic, boron, gallium, indium, palladium, phosphorus, and silicon. Thereafter, the metal and oxide to which the selected foreign atoms and/or ions have been applied is heated to a preselected temperature for a time effective to make the oxide, where the selected foreign atoms and/or ions have been applied, electrically conducting and in electrical contact with the metal or metal alloy. The electrically conducting area may be plated with a metal to which an electrical connection can be easily made, for example, by soldering.

In one application of the invention, the native oxide layer on a sheet of tantalum is treated in accordance with the invention to convert the oxide from an electrically insulating state to an electrically conducting state. Thereafter, electrolytic capacitor containers are formed from the sheet with the electrically conducting oxide inside the container to form a direct electrical connection to a capacitor electrolyte as a terminal of the capacitor.

In another application, an electrical connection between two metals covered by native oxides is made merely by physical contact between the metals treated according to the invention. Direct physical contact connections simplify the construction of a stack of capacitor elements, permit switch and relay contacts to be made of metals forming native oxides without noble metal plating, and permit direct wire connections without soldering.

DETAILED DESCRIPTION OF PREFERRED EMBODIMENTS

In the invention, electrically insulating, native oxide films on metals and metal alloys are treated to convert the oxide to an electrically conducting state. The change in conductivity is brought about by the inclusion in the oxide of selected foreign atoms and/or ions that facilitate electrical conduction.

The invention may be applied to numerous metals that form native oxides, such as aluminum, molybdenum, niobium, tantalum, titanium, tungsten, and zirconium. The invention may also be applied to stainless steel alloys. In order to incorporate the selected foreign atoms and/or ions in the oxide layer, the selected foreign atoms and/or ions are first deposited on the surface of the oxide. The foreign atoms may be deposited in ionic form on the native oxide by applying a solution in which a compound including a selected foreign atom is dissolved by condensation of the foreign atoms from a vapor phase, by mechanically applying the foreign atoms to the oxide, or otherwise. After the foreign atoms and/or ions are applied, the metal and native oxide are subjected to an elevated temperature for a time period effective to incorporate the selected foreign atoms and/or ions into the native oxide film and to change the native oxide film from an electrical insulator to an electrical conductor. The higher the temperature of the heat treatment, the shorter the time required for the incorporation of the foreign atoms and/or ions. This effect suggests diffusion of the foreign atoms and/or ions into the native oxide, but the exact mechanism of incorporation has not been determined.

The foreign atoms and ions of choice for the invention include aluminum, antimony, arsenic, boron, gallium, indium, palladium, phosphorus, and silicon. Boron, phosphorus, and palladium are preferred species for converting a native oxide film from an electrical insulator to an electrical conductor.

The usefulness of the invention has been demonstrated with tantalum. An aqueous solution of boric acid and trisodium phosphate was applied to a tantalum sample. Boric acid is only slightly soluble in water and the trisodium phosphate was added to increase the solubility of boric acid and the concentration of boron in the solution. The solution was prepared by mixing three parts by weight of boric acid with five parts by weight of trisodium phosphate. The mixture was then added to water to form a saturated solution. After degreasing the tantalum with organic solvents, the solution was applied with a brush to one side of the tantalum. Spraying, wiping, and other techniques may also be employed to apply the solution. The other side of the tantalum was protected from the solution. After the solution dried, the tantalum was heat treated in air at about 650° C. for about one minute.

In order to determine whether the oxide was electrically conducting, the treated tantalum was employed as an electrode in a conventional copper electroplating apparatus using an aqueous solution of sulfuric acid containing copper ions as the electrolyte. Copper plated on the surface of the tantalum oxide that had been treated with the boron ions. However, there was no trace of copper on the opposite side of the tantalum. This result demonstrates that the oxide was made electrically conducting where coated with the solution and heat treated but remained electrically insulating where not coated, even after heat treatment. An electrical lead was soldered to the copper plated tantalum, providing a direct electrical connection to the tantalum underlying the oxide film. Other metals, including noble metals such as palladium, silver, and gold, can be directly plated on the electrically conductive native oxide using conventional plating techniques. Plated contacts for switches and relays can thereby be made from metals forming native oxides without an oxide removal step or process. Other techniques besides soldering may be used for attaching a lead to a metal plate on the electrically conductive tantalum oxide, thereby contacting the underlying tantalum.

The tantalum surface is glassy because of the oxide and an applied solution tends to form beads, i.e., the surface has poor wettability. To combat that problem, a surfactant may be used to improve wetting of the tantalum oxide surface by the solution containing the foreign atoms and/or ions. Commercially available surfactants, such as Surfanol, a product of Union Carbide, and Jet Dry, a consumer dishwashing wetting agent, both provided good results when directly added to the solution. Addition of two drops of surfactant to 100 milliliters of solution improved wetting of the tantalum oxide.

The same success in making electrical contacts to normally insulating native oxides has been achieved by applying the same solution to niobium, titanium, and 316 stainless steel. The niobium and titanium were heated for thirty seconds in air at 650° C. The 316 stainless steel was heat treated in air for sixty seconds at 500° C.

The invention is not limited to application of the selected foreign atoms and/or ions from a liquid solution. For example, selected foreign atoms may be applied mechanically, for example, by impact or frictionally. A brush made from palladium wires was brought into contact with and brushed across a dry tantalum surface. It is believed that palladium atoms were thereby mechanically transferred to the tantalum and tantalum oxide. The brushed tantalum was heated to 900° C. for fifteen minutes, producing an electrically conductive surface that could be plated with a metal and otherwise electrically contacted to establish electrical contact to the underlying tantalum metal.

The mechanism by which the electrically insulating native oxide is converted into an electrical conductor has not been fully confirmed. The native oxides have been known to exhibit certain properties of semiconductors. The addition of selected foreign atoms and/or ions, such as aluminum, antimony, arsenic, boron, gallium, indium, palladium, phosphorus, and silicon, may alter the energy level structure within the oxide sufficiently to support electrical conduction. The selected foreign atoms and/or ions, once incorporated into the native oxide, are believed to provide charge carriers to the native oxide, either as negative charge donors or positive charge acceptors.

The invention may be effectively applied in the manufacture of electrical components employing the metals and alloys that form native oxides. For example, an electrical contact established through a native oxide layer to tantalum can be directly employed in forming a container for a tantalum electrolytic capacitor, either of the "wet slug" type that employs a corrosive liquid electrolyte, such as sulfuric acid, or a dry type. In those capacitors, the well known corrosion resistance of tantalum is exploited. Tantalum is the capacitor container and usually the cathode of the capacitor as well. The inside of the container is an electrical contact and, in wet slug capacitors, is in actual contact with the sulfuric acid electrolyte. However, the native oxide film is an electrical insulator that prevents good electrical contact between the tantalum cathode and the electrolyte. To overcome this problem, various techniques are used to eliminate the oxide layer, for example, removal of the oxide and plating the bare tantalum with an expensive noble metal, such as silver, gold, or alloys of silver, gold, and platinum, or the formation of an electrically conducting tantalum compound, such as tantalum carbide on the inside surface of the container. The materials employed are expensive and the steps required to plate the interior of the containers are costly and time consuming. In addition, the metal plating or electrically conducting compound must be disposed on the tantalum as a continuous film for maximum performance. Therefore, the plating or compound formation is carried out after the tantalum is formed into the container shape to avoid damage to the coating. The individual treatment of the separate containers adds to the cost and complexity of the manufacturing process.

According to the invention, the native oxide on one side of a tantalum sheet can be made electrically conducting. Thereafter, a plurality of tantalum capacitor containers can be formed from the sheet with the electrically conducting oxide on the inside of each container. Typically, the capacitor containers resemble generally cylindrical cans and are formed by drawing the sheet. Any damage to the oxide film during the container formation steps is naturally healed by the reformation of the native oxide without significant loss in the electrical conductivity of the treated oxide. Most preferably, an excess of the foreign atoms and/or ions are deposited on the native oxide. Any new oxide that forms after damage to the original but conducting oxide is readily made conducting by diffusion or another transport mechanism of the excess atoms and/or ions. The electrical connection to the can may be made directly to the capacitor electrolyte or may be a physical wire connection from one electrode of the capacitor to the electrically conducting tantalum can.

Since the steps of the invention are simple, the cost of precious metals and complex capacitor container fabrication steps are avoided. Similarly, the preparation of electrodes of tantalum and other metals that form native oxides for use in electrochemical cells, such as batteries, electroplating apparatus, and the like, is greatly simplified by the invention. Instead of taking extraordinary steps to eliminate the native oxide layer, the conversion of the oxide layer to an electrically conductive form permits direct use of the metal or alloy in these applications. Electrical contacts are easily made to the electrically conducting oxide by conventionally electroplating metal on it and attaching a lead or a wire to the electroplated metal by a conventional technique, such as soldering, welding, brazing, thermocompression bonding, and the like.

Typically, each packaged capacitor includes a plurality of capacitor elements electrically connected in series. The capacitor elements are physically stacked. When the elements include tantalum electrodes, some steps, such as oxide stripping and plating, have been necessary to ensure good electrical connections between the elements merely from physical contact. However, in the invention, direct physical contact between two capacitor elements having treated, i.e., electrically conducting, oxides is sufficient for establishing good electrical connection.

Likewise, other direct electrical connections, i.e., physical contacts, without applying special plating or protective steps can be made through the invention. Relay and switch contacts can be made of molybdenum, titanium, and tungsten and other metals that form native oxides by treating the oxides according to the invention to make them electrically conducting. If plated contacts are desired, the electrically conducting oxide can be readily plated without oxide stripping and oxide formation prevention steps.

The invention has been described with respect to certain preferred embodiments. Various modifications and additions within the spirit and scope of the invention will occur to those of ordinary skill in the art. Accordingly, the scope of the invention is limited solely by the following claims.

I claim:

1. A method of making an electrically insulating native oxide on a metal electrically conductive comprising:
    applying at least one selected from the group consisting of atoms and ions of aluminum, antimony, arsenic, boron, gallium, indium, phosphorus, and silicon to an electrically insulating native oxide on a body selected from the group consisting of aluminum, molybdenum, niobium, tantalum, titanium, tungsten, zirconium, and stainless steel; and
    heating the body and native oxide to which the selected atoms and/or ions have been applied to a temperature and for a time effective to make the oxide, where the selected atoms and/or ions have been applied, electrically conductive and in electrical communication with the body.

2. The method of claim 1 including preparing a solution including ions selected from the group consisting of aluminum, antimony, arsenic, boron, gallium, indium, phosphorus, and silicon and applying the solution to the native oxide, thereby applying the selected ions to the body.

3. The method of claim 1 including applying atoms selected from the group consisting of aluminum, antimony, arsenic, boron, gallium, indium, phosphorus, and silicon to the native oxide by condensing the selected atoms on the native oxide from a vapor phase.

4. The method of claim 1 including applying atoms selected from the group consisting of aluminum, antimony, arsenic, boron, gallium, indium, phosphorus, and silicon to the native oxide by mechanically contacting a source of the selected atoms with the oxide.

5. The method of claim 2 including forming an aqueous solution of boric acid and applying the solution of boric acid to the electrically insulating native oxide.

6. The method of claim 5 wherein the metal is tantalum and includes heating the metal and oxide to a temperature of about 650° C. for about one minute.

7. The method of claim 5 wherein the metal is selected from the group consisting of niobium and titanium and includes heating the metal and oxide to a temperature of about 650° C. for about thirty seconds.

8. The method of claim 5 wherein the metal is 316 stainless steel and includes heating the metal and oxide to a temperature of about 500° C. for about one minute.

9. A method of making an electrical contact to a tantalum body comprising brushing with a noble metal the native oxide on the tantalum body where an electrical contact is to be formed and heating the body to a make the native oxide, where the native oxide was brushed, electrically conductive and in electrical communication with the body.

10. The method of claim 9 including brushing the tantalum with palladium and heating the brushed tantalum to about 900° C. for about fifteen minutes.

11. The method of claim 1 including electroplating a metal on the electrically conductive oxide.

12. A method of making an electrical contact to a body selected from the group consisting of niobium, tantalum, titanium, and stainless steel comprising:
    applying a solution containing boron ions to at least one area of an electrically insulating native oxide on a body selected from the group consisting of niobium, tantalum, titanium, and stainless steel where an electrical contact to the body is to be formed; and
    heating the body to a temperature and for a time effective to make the native oxide, where the solution was applied, electrically conductive and in electrical communication with the body, thereby forming an electrical contact to the body extending through the native oxide.

13. The method of claim 12 including preparing an aqueous solution of boric acid and applying the aqueous solution of boric acid to the electrically insulating native oxide.

14. The method of claim 13 including preparing the aqueous solution of boric acid by dissolving a mixture of three parts by weight of boric acid and five parts by weight of trisodium phosphate in water.

15. The method of claim 12 including adding to the solution, before applying it to the native oxide, a surfactant to improve the wetting of the native oxide.

16. The method of claim 12 including electroplating a metal on the electrically conductive oxide.

17. A method of making tantalum containers for capacitors comprising:
    applying a solution including boron ions to an electrically insulating native oxide on one side of a tantalum sheet;
    heating the tantalum sheet to a temperature and for a time sufficient to make the native oxide, where the solution was applied, electrically conductive and in electrical communication with the tantalum sheet, thereby forming an electrical contact to the tantalum sheet extending through the native oxide; and
    forming the tantalum sheet into at least two generally cylindrical containers for capacitors, the electrically conductive native oxide being disposed on the inside of the containers.

18. The method of claim 17 including heating the tantalum to about 650° C. for about one minute.

19. The method of claim 17 including preparing an aqueous solution of boric acid and applying the aqueous solution of boric acid to the electrically insulating native oxide.

20. The method of claim 17 including preparing the aqueous solution by dissolving a mixture of three parts by weight of boric acid and five parts by weight of trisodium phosphate in water.

21. The method of claim 17 including adding to the solution, before applying it to the native oxide, a surfactant to improve the wetting of the native oxide.

22. A method of making an electrically insulating native oxide on a metal selected from the group consisting of niobium, tantalum, titanium, and stainless steel electrically conductive comprising:

applying a solution containing phosphorus ions to an electrically insulating native oxide on a metal selected from the group consisting of niobium, tantalum, titanium, and stainless steel; and heating the metal and native oxide to which the solution has been applied to a temperature and for a time effective to make the native oxide, where the solution was applied, electrically conductive and in electrical communication with the metal.

23. The method of claim 22 including preparing the solution by dissolving a mixture of three parts by weight of boric acid and five parts by weight of trisodium phosphate in water.

24. The method of claim 23 including adding to the solution, before applying it to the native oxide, a surfactant.

25. The method of claim 23 including electroplating a metal on the electrically conductive oxide.

26. The method of claim 9 including electroplating a metal on the electrically conductive oxide.

* * * * *